Patented Dec. 9, 1924.

1,518,365

UNITED STATES PATENT OFFICE.

NAZIK SHAHAPZIAN, OF WASHINGTON, DISTRICT OF COLUMBIA.

OINTMENT.

No Drawing.   Application filed June 23, 1923.   Serial No. 647,377.

*To all whom it may concern:*

Be it known that I, NAZIK SHAHAPZIAN, a citizen of Greece, residing at Washington, in the District of Columbia, have invented a new and useful Ointment, of which the following is a specification.

My invention relates to an ointment for external use, and my object is to produce an ointment which is especially adapted for the treatment of skin affections, eruptions and the like.

My ointment consists of the following ingredients combined in substantially the proportions indicated:

| | Parts. |
|---|---|
| Sesame oil | 100 |
| Mutton suet | 90 |
| Beeswax | 80 |
| Castile soap | 70 |
| Tar | 60 |
| Gum mastic | 15 |

I use the above ingredients in the purest form in which they are obtainable.

The ointment is prepared by melting together the ingredients preferably in the order named. The sesame oil is first heated to near its smoking temperature; then the mutton suet is added and when it is completely melted, the beeswax is added, and so on until all of the ingredients have been added and incorporated, forming a uniform homogeneous composition. This composition is next heated up to about 60° C., and let cool at room temperature. It solidifies when cooled down to room temperature and is then ready to be put in jars or suitable containers for distribution.

My ointment is non-poisonous, thoroughly harmless, and will retain indefinitely its freshness, even when exposed to the atmosphere. It has been proven by a great number of trials to have remarkable efficacy in the treatment of boils, piles, skin eruptions caused by poison ivy and the like, and many other skin affections.

I claim:

A composition consisting of sesame oil, mutton tallow, beeswax, castile soap, tar, and gum mastic, in substantially the proportions specified.

In testimony whereof I hereunto affix my signature.

NAZIK SHAHAPZIAN.